Jan. 5, 1960
M. KANN
2,919,736
THREADED FASTENER RETAINING DEVICE
Filed July 1, 1957
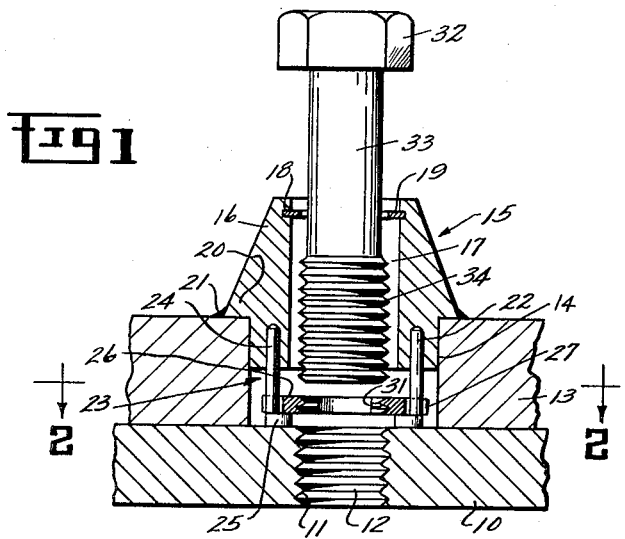
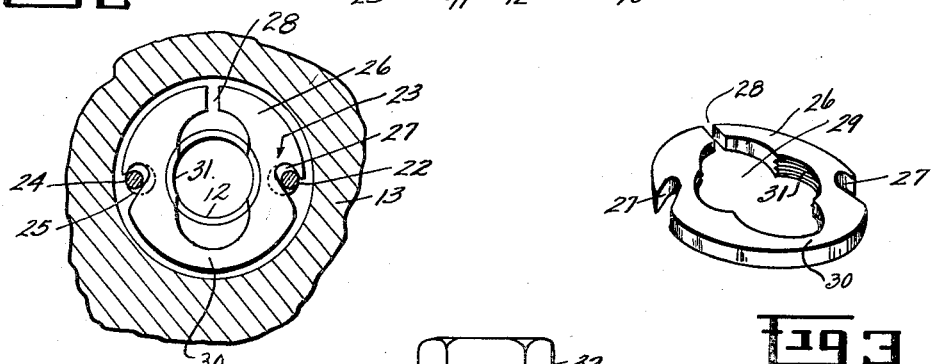
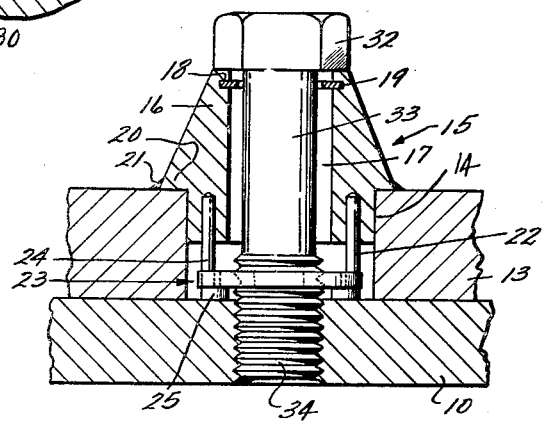
INVENTOR.
MYRON KANN
BY
Paul R. Webb, II
HIS ATTORNEY- United States Patent Office 2,919,736
Patented Jan. 5, 1960

2,919,736

THREADED FASTENER RETAINING DEVICE

Myron Kann, Cincinnati, Ohio, assignor to General Electric Company, a corporation of New York Application July 1, 1957, Serial No. 669,258

3 Claims. (Cl. 151—69)

This invention relates to threaded fastener retaining devices and more particularly to threaded fastener retaining devices which house securely the threaded portion of a fastener therein when the retaining device positioned in a flange aperture is not affixed to another structure.

One type of prior retaining device employs an elastic washer in the counterbore of its housing to secure the threaded portion of a bolt therein when the retaining device is not engaged to an adjoining structure. Such a washer exerts a binding force against the unthreaded bolt shank to prevent the bolt from easily sliding out of its housing. However, an accidental force on the bolt head would overcome the binding force and expose the bolt threads to damage outside the housing.

Another retaining device has a housing with an axial bore therethrough, a closure at one end thereof and bolt retaining means near the opposite end of the housing. A pair of resilient members with a threaded bolt follower are located within the closure. In the disengaged condition, a bolt is retained between the bolt remaining means and the upper surface of the threaded bolt follower. However, under certain conditions the bolt follower produces an undesirable locked thread effect.

The invention of the present application provides an improved threaded fastener retaining device which retains positively at any attitude the threaded portion of the fastener within the device in its disengaged condition without permitting a locked thread condition.

It is an object of my invention to provide an improved treaded fastener retaining device which tolerates reasonable misalignment between axes of the retaining device and engaged structure.

It is another object of the invention to provide an improved threaded fastener retaining device which employs a slotted threaded fastener follower to retain the threaded portion of a fastener within the device in its disengaged condition and to prevent a locked thread effect.

It is another object of the invention to provide an improved threaded fastener retaining device into which a new fastener can be inserted rapidly.

It is a further object of the invention to provide an improved threaded fastener retaining device which is positioned easily in a simple flange aperture to produce a fastening structure.

In carrying out my invention in one form, a housing with an axial bore therethrough and a pair of members positioned at one end thereof, has fastener retaining means near the opposite end of the housing and a slotted fastener follower engaging the members to provide a threaded fastener retaining device.

These and various other objects, features and advantages of the invention will be better understood from the following description taken in connection with the accompanying drawing in which:

Fig. 1 is a sectional view of a lower flange and an upper flange with a threaded fastener retaining device embodying my invention;

Fig. 2 is a view on line 2—2 of Fig. 1;

Fig. 3 is a perspective view of the slotted fastener follower shown in Fig. 1; and Fig. 4 is a sectional view similar to Fig. 1 in which the upper flange with threaded fastener retaining device is engaged with the lower flange.

In Fig. 1 of the drawing, a lower flange 10 is shown with at least one aperture 11 therein which is threaded as at 12. An upper flange 13 positoned on lower flange 10 is provided with an aperture 14 into which a threaded fastener retaining device 15 is positioned to form a fastening structure. Device 15 includes a housing 16 with an axial bore 17 therethrough forming an opening at each end thereof. At the upper end of bore 17 adjacent its opening, a recess 18 seats a retainer 19 to provide an upper fastener retaining element. Housing 16 has an outwardly extending flange 20 which seats against exterior surface of upper flange 13. Housing 16 is positioned in aperture 14 by welding as at 21 or by threading, keying or staking.

A pair of openings 22 are located in lower end of housing 16 in which are positioned a pair of members 23. Each member 23 is shown in the form of a pin including a shaft portion 24 and a headed portion 25. While a pair of openings 22 and associated members 23 are preferred and disclosed in Fig. 1, any number can be employed. A fastener follower 26 slidably engages shaft portions 24 of members 23 by means of apertures or slots 27 which are provided at the periphery of follower 26.

As is best shown in Figs. 2 and 3, follower 26 is also slotted at 28 to allow opening to a diameter greater than as machined originally. Slots 27 permit expansion of follower 26 during enlargement of opening 28. While slots 27 are shown, any type of clearance opening can be provided. Follower 26 has a central opening configuration 29 which is viewed as three overlapping circular openings. The portion of follower 26 bounded by one non-central circular opening and the outside diameter of follower 26 and diametrically opposite opening 28 forms an elastic beam portion 30. A pair of threaded segments 31 are located on opposite sides of the inner surface of follower 26 between slot 28 and beam portion 30.

A headed fastener 32, which is located in bore 17 and between members 23 of threaded fastener retaining device 15 includes a reduced shank portion 33 movable within bore 17, and a threaded end portion 34 having a shorter length than the distance between retainer 19 and lower bore opening of housing 16 and movable within bore 17 and between members 23. In its disengaged condition, threaded end portion 34 of fastener 32 is retained between retainer 19 and the upper surface of threaded fastener follower 26 within device 15 to protect the threaded portion against damage.

In Fig. 4, upper flange 13 is shown affixed to lower flange 10 by means of fastener 32. Threaded portion 34 of fastener 32 engages threads 12 of aperture 11 in lower flange 10 to provide a tight joint between flanges 10 and 13. Shaft portions 24 of members 23 prevent follower 26 from turning more than a small arc while headed portions 25 prevent follower 26 from slipping off the lower ends of shaft portions 24. Lower surfaces of headed portions 25 are flush, or above, the lower surface of flange 13.

In the operation of bolt retaining device 15, members 23 are passed through slots 27 of follower 26 and positioned in openings 22. Headed fastener 32 is inserted through upper bore opening of housing 16 and retained at its lower end on the upper surface of threaded fastener follower 26. After insertion of fastener 32, retainer 19 is positioned in recess 18 of housing 16 to prevent fastener removal from upper bore opening by lifting, gravity or threading. Threaded end portion 34 is restrained positively from exposure outside retaining device 15 unless fastener 32 is threaded through fastener follower 26. Device 15 is then positioned in aperture 14 of flange 13 and welded as at 21. If desired, housing 16 of device 15 can be located in aperture 14 by threading, keying or staking. Upper flange 13 is positioned on lower flange 10 with the axes of apertures 11 and 14 in axial alignment. Threaded end portion 34 of fastener 32 is threaded through fastener follower 26 to mate threaded end portion 34 with threads 12 of aperture 11 in flange 10 to join flanges 10 and 13 together. Predetermined side clearance between fastener 32, retainer 19 and housing 16 allows for a small amount of axial misalignment between axes of apertures 11 and 14. When threaded portion 34 engages fastener follower 26, members 23 positioned in slots 27 prevent follower 26 from turning more than a small arc. If the leading helix of threaded end portion 34 is in rotational phase with leading helix of threads 12, threaded end portion 34 engages with threads 12 and feeds into aperture 11 of flange 10.

However, if leading helixes of threaded end portion 34 and threads 12 are not in rotational phase, follower 26 moves away from headed portion 25 of member 23 until leading helixes are in rotational phase and threaded end portion 34 engages threads 12. If follower 26 contacts the lower surface of housing 16 before the leading helixes became rotationally aligned, threaded fastener follower 26 prevents any contact of threaded fastener follower 26 with the adjacent surface of housing 16 from completely mechanically jamming threaded end portion 34 by locked thread effect. Jamming is prevented when the diametrical force component from the incipiently jammed thread flanks of engaged threaded end portion 34 and threaded segments 31 of follower 26 forces follower 26 to spread by means of employment of slot 28 to accommodate the necessary change in engaged pitch diameter of threaded end portion 34 and follower 26. Spreading of slot 28 continues until threaded segments 31 are forced to pass over the major diameter of threaded end portion 34 and re-engage the adjacent thread thereof. Threaded segments 31 require only a small diametrical opening of follower 26 to accomplish this thread passing. Such spreading is continuously available because of the elastic characteristics of beam portion 30.

When it is desired to remove flange 13 from flange 10, fastener 32 is turned in reverse direction to unthread threaded end portion 34 from threads 12 in aperture 11. During this operation fastener follower 26, which is engaged with threaded end portion 34 moves axially or expands to accommodate fastener 32. Locking of threaded end portion 34 with threads of follower 26 before threaded end portion 34 clears threads 12 is prevented by side thrust of the threaded flanks of threaded end portion 34 against follower 26 which thrust causes change in pitch diameter. Since threaded end portion 34 has a shorter length than the distance between retainer 19 and lower bore opening of housing 16, fastener 32 passes completely through fastener follower 26 before leading threads of threaded end portion 34 have risen to contact retainer 19. Fastener follower 26 falls free of threaded end portion 34 and positions itself on the inner, lower surfaces of headed portions 25 of member 23 as viewed in Fig. 1. In its disengaged position, fastener 32 has its threaded end portion 34 positioned between retainer 19 and upper surface of fastener follower 26. It is impossible for fastener 32 to fall free from either end of retaining device 15.

While other modifications of this invention and variations of apparatus which may be employed within the scope of the invention have not been described, the invention is intended to include all such as may be embraced within the following claims.

What I claim as new and desire to secure by Letters Patent of the United States is:

1. A threaded fastener retaining device comprising a housing having an axial bore therethrough forming an opening at each end thereof, a retainer located near one end of said housing adjacent said bore opening, a pair of headed pins mounted on the opposite end of said housing, a fastener follower provided with a pair of slots engaging slidably said pins, said follower having a third slot extending therethrough for spreading said follower, a pair of threaded segments located on the inner surface of said follower, a headed fastener located in the bore and between the pins of said threaded fastener retaining device including a reduced shank portion movable within said bore, and the threaded portion having a shorter length than the distance between said retainer and the lower bore opening of said housing, said threaded end portion being movable within said bore and between said pins, said segments adapted to engage continuously the threaded portion of said headed fastener during engagement of said retaining device and said retainer and said threaded fastener follower adapted to retain the threaded end portion therebetween during disengagement of said retaining device.

2. A threaded fastener retaining device comprising a housing having an axial bore therethrough forming an opening at each end thereof, fastener retaining means located near one end of said housing adjacent to said bore opening, at least one member positioned on the opposite end of said housing, a fastener follower engaging slidably said member, said follower having a slot extending therethrough for spreading thereof, at least one threaded segment located on the inner surface of said follower, said segment adapted to engage continuously the threaded portion of a headed fastener during engagement of said retaining device, and said retaining device adapted to position a headed fastener having a reduced shank portion and a threaded end portion therein whereby said fastener retaining means and said threaded fastener follower retain the threaded end portion therebetween during disengagement of said retaining device.

3. A threaded fastener retaining device comprising a housing having an axial bore therethrough forming an opening at each end thereof, a retainer located near one end of said housing adjacent to said bore opening, a pair of headed pins mounted on the opposite end of said housing, a fastener follower provided with a pair of slots engaging slidably said pins, said follower having a third slot extending therethrough for spreading thereof, a pair of threaded segments located on the inner surface of said follower, said segments adapted to engage continuously the threaded portion of a headed fastener during engagement of said retaining device, and said retaining device adapted to position a headed fastener having a reduced shank portion and a threaded end portion in the bore and between the pins thereof whereby said threaded retainer and said threaded fastener follower retain the threaded end portion therebetween during disengagement of said retaining device.

References Cited in the file of this patent

UNITED STATES PATENTS

| | | |
|---|---|---|
| 780,951 | Kulhanek | Jan. 24, 1905 |
| 1,255,786 | Phillips | Feb. 5, 1918 |
| 2,736,227 | Stroble | Feb. 28, 1956 |